July 16, 1946.  A. P. D. BELANGER  2,403,901
POLYGONAL SEPARABLE SECTION CONTAINER
Filed Jan. 7, 1944
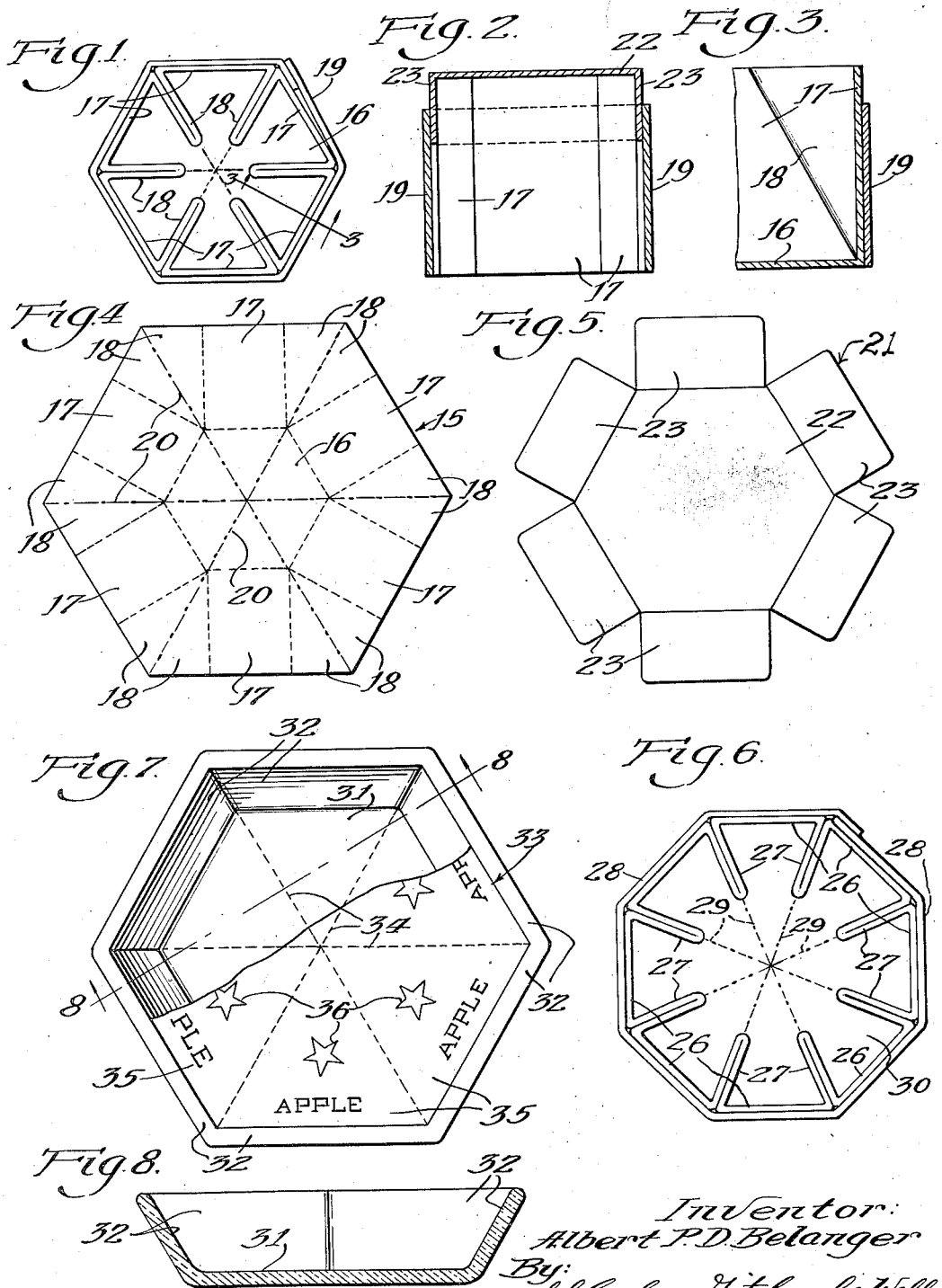

Patented July 16, 1946

2,403,901

UNITED STATES PATENT OFFICE 2,403,901

POLYGONAL SEPARABLE SECTION CONTAINER

Albert P. D. Belanger, Alton, Ill.

Application January 7, 1944, Serial No. 517,319

3 Claims. (Cl. 229—27)

This invention relates to containers of a type suitable for the preparation and handling of a product, and it has for its object the provision of a new and improved form and arrangement of such container, whereby the product may be readily prepared to advantage for display or sale, and whereby such product may be easily divided into portions for sale or serving. It is one of the objects of my invention to provide an improved form of container for use as a mold for forming and handling such products, as Jello, cheese, candy or ice cream, or other products adapted to harden into condition for handling, or for baking or otherwise cooking pies, cakes, custards, meat loaves or the like.

For carrying out my objects, I have provided containers formed of paper, metal, glass, or other suitable material, and made of a size and shape to correspond to the type of product to be baked or handled, and to correspond to the size of portion normally desired for service or sale. The preferred form of container for baking pies, for example, is either hexagonal or octagonal in shape, with straight or substantially straight sides, so as to have clearly defined corners between the sides whereby there are indications by reference to which a pie baked in the container can very readily be cut into six or eight portions of similar size and shape, by simply cutting from corner to corner of the container. In containers for other uses, the arrangement varies in accordance with the requirements. A container for cheese or for meat loaf, for example, might have indications by reference to which a salesman could cut the product readily into portions of approximately a pound each, and the indications in connection with a container for ice cream might be arranged for enabling the salesman to cut the product readily into approximately pint or quart portions. In any case, it is the object of the invention to provide a container with indications adapted to expedite the division of the product in the container into the particular kind and size of portions desired for that product.

It is one of the objects of the invention to provide a container formed of paper or other sheet material adapted to cut easily so as to enable it to be divided readily into sections along clearly indicated lines, the sheet material of the container being in some cases weakened along the lines of division by scored lines or lines of perforations so as to expedite the separation of the container into its unit parts.

It is another object of the invention to provide inwardly projecting tabs at the corners of the container so as to partially divide the container into sections of the size and shape desired for individual handling. In connection with containers of this type, it is one of the objects of the invention to form the corner tabs so as to be open at the outer face of the container for enabling a cutting blade to be inserted and held in position for a cutting operation, the paper or other sheet material from which the container is made being preferably weakened at the inner edges of the inwardly projecting tabs for expediting the separation of the container and its contents into sections.

It is another object of my invention to improve containers of this type in sundry details hereinafter pointed out. The preferred means by which I have accomplished my several objects are illustrated in the accompanying drawing, in which Fig. 1 is a top plan view of my improved container.

Fig. 2 is a side face view of the body of the container, with a holding band and a cover member shown in section thereon.

Fig. 3 is a vertical sectional view taken substantially on the line 3—3 of Fig. 1.

Fig. 4 is a face view of the blank from which the body of the container as shown in Fig. 1 is formed.

Fig. 5 is a face view of the blank from which the cover member is formed.

Fig. 6 is a view similar to Fig. 1 but showing a modified form of container.

Fig. 7 is a top face view of a modified form of container with a pie therein broken away at one side portion; and Fig. 8 is a vertical sectional view taken substantially at the line of 8—8 of Fig. 7.

Referring now to Figs. 1 to 5 of the drawing, in which corresponding parts are indicated by the same reference characters, 15 indicates a blank made of fairly stiff heavy paper or paste board having an equiangular equilateral central hexagonal panel portion 16, six side wall portions 17, and six pairs of corner tab portions 18, all as indicated by dotted lines in Fig. 4. When the blank 15 is to be folded into box form, the side wall portions 17 are folded upwardly, causing the corner tab portions 18 to be tucked inwardly as shown in Fig. 1. For holding the parts in such folded position, a band 19 is provided, extending about the body of the container so as to prevent the side portions 17 from turning downwardly and outwardly.

In this arrangement, the corner tab portions extend inwardly directly toward the center of the container so as partially to divide the container into similar and equal compartments or sections. Each of the corner tab arrangements provides in effect a blind opening into the container, open outwardly at the face of the container so as to permit a cutting blade readily to be inserted for dividing the container into sections. For expediting the separation of the container into its several sections, the panel portion 16 is weakened by lines of perforations 20 from corner to corner of the container, being represented in the drawing by dot and dash lines, such lines of perforations being extended at both ends through the surplus sheet material at the corners of the blank so as to provide a weakened line at the inner edge of each of the tab portions 18 and so as to provide for the ready separation of each of the tab portions into its two parts.

For closing the top face of the container, I have provided a cover member preferably formed of paper of the same type as that from which the body portion of the container is made. In Fig. 5, I have shown a blank 21 comprising a central panel section 22 of hexagonal form provided with side wall portions 23, such side wall portions being formed integrally with the panel portion 22, with the side wall portions completely separate from each other. The arrangement is such that the side wall portions 23 can be readily tucked into position between the body of the container and the band 19 for application of the cover member to the container, the band 19 serving to hold the side wall portions in their right angled position with respect to the panel 22 and also to hold the removable cover in closure position on the container.

In Fig. 6 I have shown a modified form of equiangular, equilateral container comprising eight sides 26 in lieu of the six sides shown in Fig. 1. This arrangement, of course, is adapted to be divided into eight sections instead of six, eight inwardly projecting corner tabs 27 being provided for partially dividing the space of the container into compartments or sections. A band 28 surrounding the container serves to hold the side wall portions 26 in their upright position. Lines of perforations 29 are provided from corner to corner of the bottom wall panel 30, such lines of perforations 29 being extended through the surplus paper forming the tab portion 27 so as to expedite the separation of the container into its several sections when desired.

With the container in the condition as shown in Fig. 1 or Fig. 6, such products as cheese or ice cream may be placed therein, being packed between the inwardly directed corner tabs so that such tabs may partially divide the contents of the container into sections. The container may be filled with eggs for freezing, or with hot products in liquid form adapted to harden when cooling, such as fudge, or gelatine, such products being adapted to distribute themselves evenly in the several sections of the container.

In the arrangement shown in Fig. 7, I have provided an equiangular, equilateral container of hexagonal form with the sides flared upwardly, the container shown being formed of glass. This container comprises a bottom panel 31, and straight side wall portions 32 arranged at an angle of approximately thirty degrees from the vertical. At one side portion, the container has a pie 33 therein, dotted lines 34 from corner to corner of the container serving to indicate the division of the container into sections and the division of the pie into portions of the usual conventional shape. In the arrangement shown, each portion of the pie is provided with a decoration 36 of any suitable type, with the separate elements of the decoration similarly arranged on the several portions of the pie, the operator being able to arrange the decoration in this manner by reference to the straight sides of the container. By reason of the use of this type of container, a waiter in a restaurant is able very quickly and easily to cut the pie into similar and equal pieces by merely cutting straight from corner to corner of the container without the use of a guiding device such as is often used for mechanically controlling the cutting of portions for serving.

My improved containers of polygonal shape with substantially straight sides have been found in use to be convenient and practical. With the size of the container regulated for any particular product so as to lead normally and easily to the provision of sections or portions of predetermined size for serving or for sale, the work and bother in connection with the preparation and sale of the product are kept to a minimum.

While I prefer to employ the form and arrangement of parts as shown in my drawing and as above described, the invention is not to be limited thereto except so far as the claims may be so limited, it being understood that changes might well be made in the form and arrangement of the parts without departing from the spirit of the invention.

I claim:

1. A polygonal container formed of sheet material and having at least six substantially straight sides and having blind openings leading inwardly at the corners provided by inwardly tucked outwardly open folds into which a cutting blade can be inserted for separating the container into sections, the bottom wall portion of the container being weakened along lines from corner to corner with the weakened lines extended along the inner edges of the inwardly tucked parts for expediting separation of the container into sections.

2. A polygonal container formed of sheet material and having at least six substantially straight sides and having blind openings leading inwardly at the corners provided by inwardly tucked outwardly open folds into which a cutting blade can be inserted for separating the container into sections, the bottom wall portions of the container being weakened by lines of perforations thereacross from corner to corner with the lines of perforations extended along the inner edges of the inwardly tucked parts for expediting separation of the container into sections.

3. A polygonal container comprising a bottom panel formed from a piece of sheet material, side wall portions turned upwardly along the sides of the bottom panel with the surplus sheet material at the corners tucked inwardly into the form of triangular tabs extending directly toward the center of the container, said bottom panel being weakened along lines from corner to corner with the weakening lines extending along the inner edges of the tabs whereby the container can be readily separated into sections, and band means about the side walls serving to hold them in substantially upright position.

ALBERT P. D. BELANGER.